United States Patent
Robin et al.

(10) Patent No.: US 9,214,660 B2
(45) Date of Patent: Dec. 15, 2015

(54) FLEXIBLE SUBSTRATE BATTERY JACKET

(71) Applicants: Olivier Robin, San Diego, CA (US); Francisco Carlos Sanchez Ortiz, San Diego, CA (US)

(72) Inventors: Olivier Robin, San Diego, CA (US); Francisco Carlos Sanchez Ortiz, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 195 days.

(21) Appl. No.: 13/689,701

(22) Filed: Nov. 29, 2012

(65) Prior Publication Data

US 2014/0147719 A1 May 29, 2014

Related U.S. Application Data

(60) Provisional application No. 61/564,818, filed on Nov. 29, 2011.

(51) Int. Cl.
*H01M 2/20* (2006.01)
*H01M 2/10* (2006.01)
*H01M 2/02* (2006.01)

(52) U.S. Cl.
CPC .......... *H01M 2/204* (2013.01); *H01M 2/1038* (2013.01); *H01M 2/0202* (2013.01); *H01M 2/0207* (2013.01); *H01M 2/0222* (2013.01)

(58) Field of Classification Search
CPC ............ H01M 2/0222; H01M 2/1038; H01M 2/0202; H01M 2/0207
See application file for complete search history.

(56) References Cited

U.S. PATENT DOCUMENTS

| 3,655,452 | A | * | 4/1972 | Cich | 429/159 |
|---|---|---|---|---|---|
| 6,265,100 | B1 | * | 7/2001 | Saaski et al. | 429/163 |
| 6,287,721 | B1 | * | 9/2001 | Xie et al. | 429/152 |
| 2004/0076858 | A1 | * | 4/2004 | Bartholf et al. | 429/1 |
| 2008/0032191 | A1 | * | 2/2008 | Kennedy et al. | 429/185 |
| 2010/0081049 | A1 | * | 4/2010 | Holl et al. | 429/162 |
| 2012/0164515 | A1 | * | 6/2012 | Wyser | 429/149 |
| 2013/0323565 | A1 | * | 12/2013 | Tucholski | 429/127 |
| 2014/0199572 | A1 | * | 7/2014 | Stewart et al. | 429/99 |

\* cited by examiner

*Primary Examiner* — Jeremiah Smith
(74) *Attorney, Agent, or Firm* — Coastal Patent Law Group, P.C.

(57) ABSTRACT

A flexible battery jacket adapted to combine two or more batteries for forming a low profile power-pack assembly. The battery jacket folds about the two or more batteries and connects respective positive and negative terminals of the batteries at one or more contacts of the battery jacket. The contacts are coupled to conductors which communicate the power to a positive and a negative supply terminal, respectively, on a single portion of the battery jacket assembly. In this regard, the flexible battery jacket combines two or more batteries in parallel or series configuration and provides supply terminals on a single substrate surface for easily connecting with an electronic device.

5 Claims, 3 Drawing Sheets

FLEXIBLE SUBSTRATE BATTERY JACKET

CROSS-REFERENCE TO RELATED APPLICATIONS

This application claims benefit of priority with U.S. Provisional Ser. No. 61/564,818, filed Nov. 29, 2011, titled "FLEXIBLE SUBSTRATE BATTERY JACKET"; the contents of which are hereby incorporated by reference.

BACKGROUND OF THE INVENTION

1. Field of the Invention

This invention relates to batteries enclosures for use in electronic devices; and more particularly to flexible substrates adapted to couple two or more batteries for use in said electronic devices.

2. Description of the Related Art

Electronic devices of several types have long utilized batteries for supply power. In the current state of the art, such batteries are available in a myriad of styles and sizes. However, although a plethora of batteries have been designed and made readily available for various power requirements, the coupling of two or more batteries is often required to supply adequate power for meeting device requirements.

When coupling two or more batteries, or "cells", several housings, couplers, and adapters have been suggested and utilized in recent years. Most commonly available adapters include a rigid plastic housing and one or more rigid conductive structures embedded or attached within the housing in a manner for receiving and coupling the two or more batteries. These rigid battery couplers generally add bulky volume and unnecessary weight to the electronic device. Furthermore, as prices of raw materials continue to increase these rigid structures having unnecessary bulk become economically unattractive.

There has yet to be provided a low-cost, low-volume, mechanically flexible coupler adapted to receive and couple two or more batteries for use in electronics devices. Such a flexible coupler otherwise referred to herein as a "jacket" will provide an affordable and light-weight versatile means for coupling two or more batteries within an electronic device.

SUMMARY OF THE INVENTION

Accordingly, the named inventors have developed a flexible battery jacket adapted to couple two or more batteries for use within an electronic device, the jacket being designed for low-cost and high-throughput manufacturing through the use of bulk printing and plating techniques as well as reduced material volume for maintaining a low cost of bulk materials. Additionally, the flexible battery jacket can be integrated into an automated assembly process wherein assembly of the batteries and the jacket can be accomplished with minimized labor for maintaining the lowest possible cost.

The flexible battery jacket provides low volume coupling of two or more batteries, and low cost production. In addition, the flexible battery jacket may provide secure attachment with the two or more batteries using a conductive adhesive. The flexible battery jacket can be configured for pairing two or more batteries in parallel or in series configuration.

The battery jacket generally comprises a flexible substrate layer having a first portion comprising a first top surface and first bottom surface thereof, a second portion comprising a second top surface and second bottom surface, the first and second portions being connected by a first bridge member, and a third portion having a third top surface and third bottom surface and being connected to the second portion by a second bridge member. The first through third portions of the flexible substrate each further comprise one or more conductive contacts each being adapted to electrically contact to a battery surface. Furthermore, one or more of the contacts disposed on the first through third portions may comprise a conductive adhesive for securely attaching to a battery surface.

BRIEF DESCRIPTION OF THE DRAWINGS

The invention is further understood by those having skill in the art upon a review of the enclosed descriptions in conjunction with the appended drawings, wherein.

DETAILED DESCRIPTION OF THE PREFERRED EMBODIMENTS

Although the illustrated embodiments described herein relate to "button cell" type batteries, it will become apparent to those having skill in the art that other embodiments may be similarly practiced. Accordingly, the herein-described embodiments are not intended to limit the spirit and scope of the invention, rather are provided for the purpose of teaching those having skill in the art to make and use the invention.

In a general embodiment, the flexible battery jacket provides a low-cost and low-profile component for coupling two or more batteries for use in an electronic device. Additionally, the battery jacket may be adapted to provide a positive contact and a negative contact disposed on a common surface of the jacket such that an assembly comprising the flexible battery jacket and two or more batteries is adapted for connection with an electrical circuit on a single surface thereof.

Moreover, the flexible battery circuit may comprise a conductive adhesive for securing the jacket to one or more surfaces of a battery. In this regard, the large volume required by springs and other retention clips is avoided for providing a light weight and low profile power source.

Furthermore, the flexible battery jacket may comprise one or more kiss cuts disposed at or near the bridge members of the battery jacket. The kiss cuts are adapted to provide increased flexibility and reduced tension for maintaining a wrapped configuration when the battery jacket is assembled with two or more batteries.

In one embodiment, a method for manufacturing a flexible substrate battery jacket includes providing a substrate base layer; adhering a top metal layer by electroplating, printing conductive ink, or other metallic plating or printing technique; applying an adhesive layer; and applying a release paper liner. In certain embodiments, one or more kiss cuts are provided for aiding in the release of the paper liner and/or providing flexibility in the battery jacket. In certain other embodiments, one or more coatings can be applied to the substrate.

Figure 1:
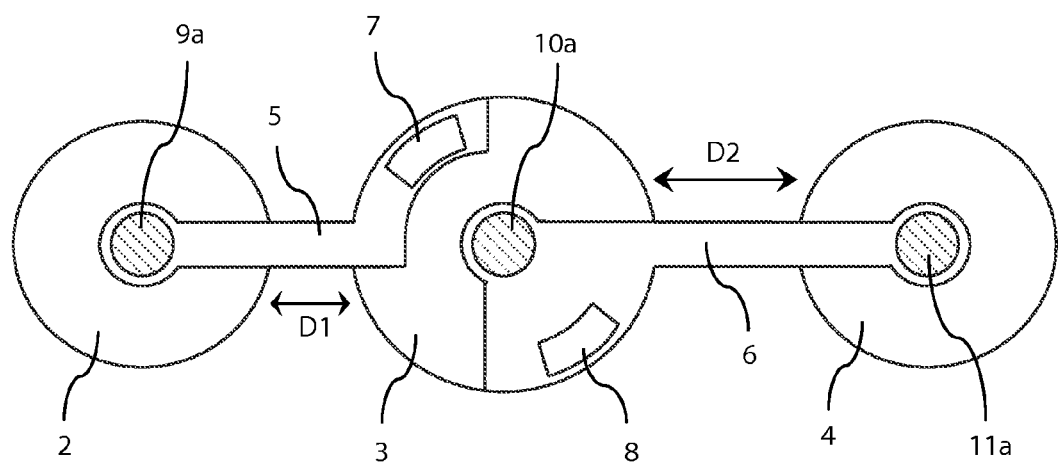
FIG. 1 illustrates a top view of a flexible battery jacket according to an embodiment of the invention, the battery jacket includes a first portion connected to a second portion by a first bridge member, and a third portion connected to the second portion by a second bridge member; a plurality of contact members are illustrated.

Now turning to the figures, FIG. 1 illustrates a top view of the flexible battery jacket. The jacket 1 comprises a first portion 2 connected to a second portion 3 by a first bridge member 5. The first bridge member comprises a length "D1" and is disposed between the first and second portions. The jacket 1 further comprises a third portion 4 connected to the second portion by a second bridge member 6. The second bridge member comprises a length "D2", wherein D2 is greater than the length D1. In a preferred embodiment, the second bridge member D2 is about double the length of D1.

Each of the portions 2-4 comprises a conductive contact member for electrically contacting a battery surface. First portion 2 comprises a first contact member 9a on a top surface thereof; second portion 3 comprises a second contact member 10a on a top surface thereof; and third portion 4 comprises third contact member 11a on a top surface thereof. Moreover, second surface 3 further comprises supply contact members 7; 8, being positive and negative supply contacts, respectively, disposed on a top surface thereof. The first contact member 9a refers to a first side of contact 9 that is opposite of a second side 9b. In this regard, second contact member 10 comprises a first side 10a disposed opposite of a second side 10b, and third contact member 11 comprises a first side 11a disposed opposite of a second side 11b.

First contact member 9 is in electrical communication with supply contact 7 in accordance with a conductive attachment extending therebetween. Furthermore, contact member 10 is in electrical communication with contact member 11 and supply member 8 in accordance with a conductive attachment extending therebetween.

Figure 2:
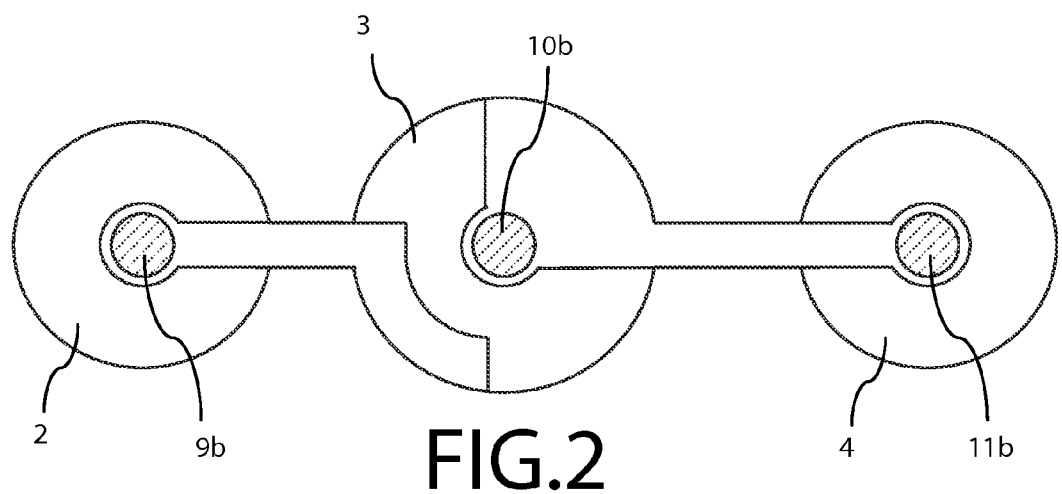
FIG. 2 illustrates a bottom view of the flexible battery jacket according to FIG. 1.

FIG. 2 illustrates a bottom view of the flexible battery jacket of FIG. 1. Each of the first through third portions 2-4, respectively, individually comprises a surface area. Although the first through third portions of FIGS. 1-2 illustrate circular portions, those having skill in the art will appreciate that any geometric shape can be incorporated. The circular portions are merely representative of the embodiment adapted to couple two button-cell batteries having a circular surface. The intent will be to design respective portions having minimum volume for reduced mass and volume for any targeted battery type.

With reference to FIGS. 1-2, the bottom surface of the first contact member 9b is adapted to contact a negative terminal of a first battery, preferably a button cell battery. Bridge member 5 is then adapted to wrap around a side of the first battery, and the bottom surface of the second contact member 10b is adapted to contact a positive terminal of the first battery. The top surface of the first contact member 9a is then adapted to contact a negative terminal of a second battery. Additionally, the second bridge member is adapted to wrap around the sides of the first and second batteries, and bottom surface of the third contact member 11b is adapted to contact a positive terminal of the second battery. In this regard, an assembly comprises the battery jacket coupled with two batteries, wherein the first portion of the battery jacket is disposed between the positive terminals of the first and second batteries, the second portion is disposed on a bottom surface of the assembly, and the third portion is disposed on a top surface of the assembly.

It should be noted that the particular orientation of positive and negative contacts of the batteries as well as the conductive pattern of the battery jacket can be configured in any desired pattern.

Figure 5:
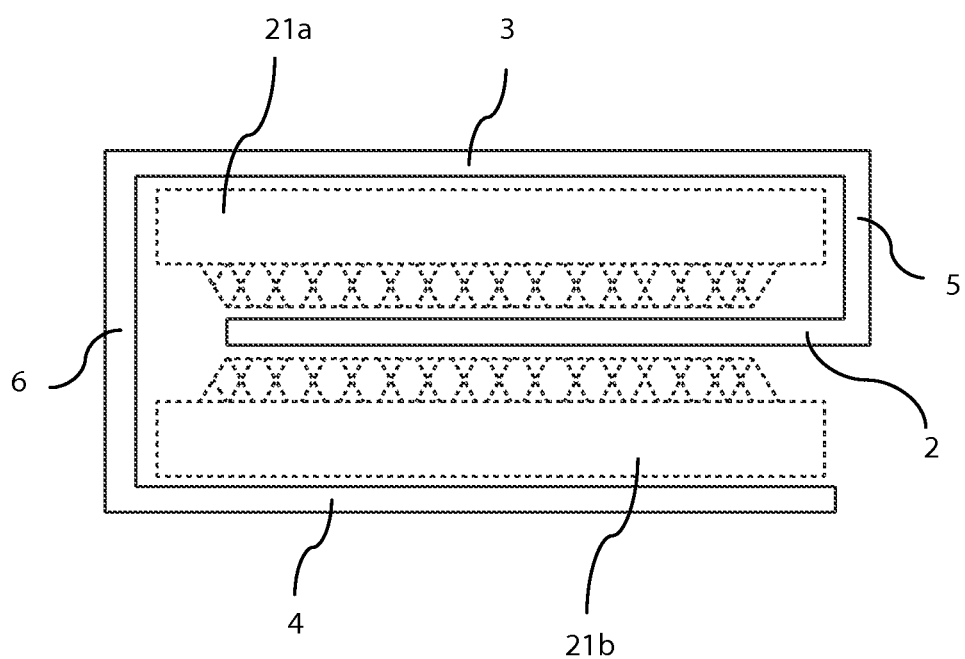
FIG. 5 illustrates a side view of an assembly formed by the flexible battery jacket and two coupled batteries.

FIG. 5 further illustrates a side view of the assembly as described above.

Figure 3:
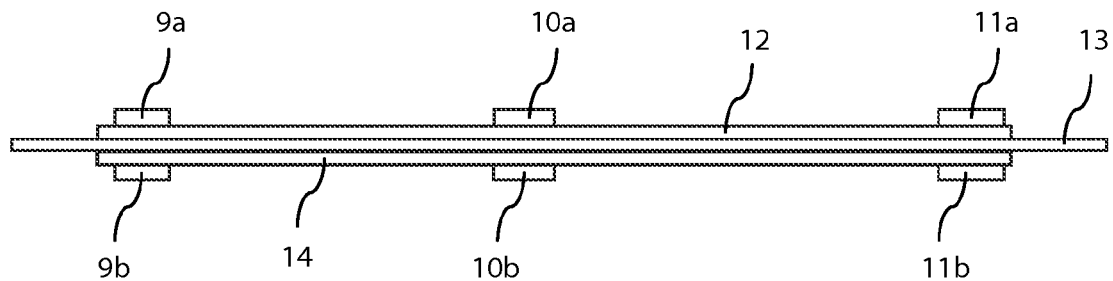
FIG. 3 illustrates a side view of the flexible battery jacket according to FIGS. 1-2.

FIG. 3 depicts a side view of the unfolded battery jacket. A flexible circuit comprises multiple layers 12-14 including any of: a liner, a base substrate, metal contact portions, and a conductive adhesive. Other layers may further include a silk-screen ink, metal plating or metallic conductive ink.

Figure 4:
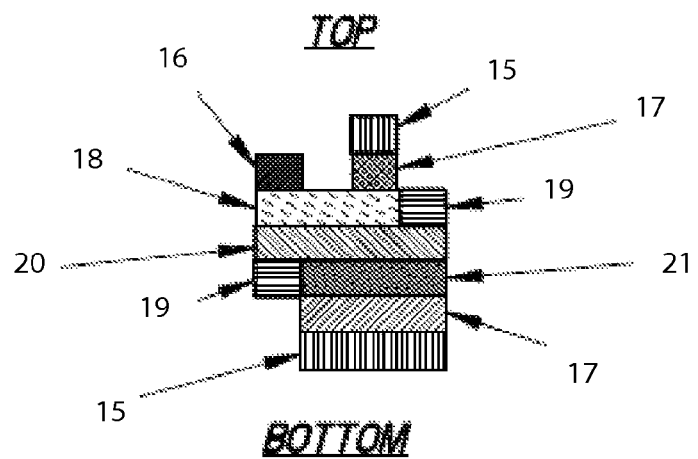
FIG. 4 illustrates a cross section of the flexible battery jacket comprising several layers.

FIG. 4 further illustrates a cross-section of the flexible jacket according to a preferred embodiment. The jacket comprises several layers stacked from a bottom surface to a top surface, comprising: a release paper liner 15; a conductive adhesive transfer tape or equivalent conductive adhesive 17; nickel, gold, or other similar metallic plating 19 on all exposed metal; a substrate base 21; a PET or PI coverlay 18; silk screen ink 16 for lettering of part numbers and brand recognition; and a top layer of release paper liner.

The flexible battery jacket may comprise one or more kiss cuts on the liner, preferably disposed adjacent to the first and/or second bridge member.

In another embodiment, an assembly comprises a flexible substrate battery jacket as described above, a first battery positioned between the first and second portions, and a second battery disposed between the second and third portions. Although the embodiment depicted in FIG. 5 illustrates two batteries aligned parallel with respect to one another, certain other embodiments may provide for a battery jacket adapted to contain two batteries aligned in series.

Moreover, the adhesive layer of the battery jacket provides a robust attachment means for maintaining contact with the battery surfaces.

In one embodiment, a flexible battery jacket for electrically combining two or more batteries comprises: a flexible substrate having a first portion, a second portion, and a third portion; the first portion having a first top surface and a first bottom surface opposite of the first top surface, and comprising: a first contact disposed on the first top surface, the first contact being adapted to couple with a first battery at a positive terminal thereof; and a second contact disposed on the first bottom surface, the second contact being adapted to couple with a second battery at a positive terminal thereof; the third portion having a first top surface and a first bottom surface opposite of the first top surface and comprising: a third contact disposed on the third bottom surface, the third contact being adapted to couple with the second battery at a negative terminal thereof; the second portion having a second top surface and a second bottom surface opposite of the second top surface, and comprising: a fourth contact disposed on the second bottom surface, the fourth contact being adapted to couple with the first battery at a negative terminal thereof; a positive supply terminal disposed on the second top surface; a first conductive trace adapted to couple the first and second contacts of the first portion with the positive supply terminal; a negative supply terminal disposed on the second top surface; a second conductive trace adapted to couple the third and fourth contacts with the negative supply terminal; wherein the flexible battery jacket is adapted to fold about the two or more batteries and provide said positive and negative supply terminals on a common surface for electrically connecting the two batteries and the flexible battery jacket to an electronic device.

In some embodiments, the flexible battery jacket is adapted to couple the two or more batteries in a parallel configuration.

In some embodiments, the flexible battery jacket is adapted to couple the two or more batteries in a series configuration.

In some embodiments, further comprising a fourth portion and additional contacts thereon for coupling three batteries.

The flexible battery jacket of claim 1, comprising a removable liner being adhered to the flexible substrate by a conductive adhesive.

In another embodiment, the flexible battery jacket comprises: a flexible substrate having a plurality of portions, each of the plurality of portions having a top and bottom surface, respectively, and each of the portions being connected one with another via a bridge member extending therebetween; a plurality of contacts disposed on the plurality of portions, each contact being adapted to couple with one of: a positive or a negative terminal of one or more batteries; a positive supply terminal coupled to at least one of the contacts via a first conductive trace; and a negative supply terminal coupled to at least one of the contacts via a first conductive trace; wherein the flexible battery jacket is adapted to fold about the two or more batteries and provide said positive and negative supply terminals on a common surface for electrically connecting the two batteries and the flexible battery jacket to an electronic device.

In various embodiments, a flexible battery jacket adapted to combine two or more batteries for forming a low profile power-pack assembly. The battery jacket folds about the two or more batteries and connects respective positive and negative terminals of the batteries at one or more contacts of the battery jacket. The contacts are coupled to conductors which communicate the power to a positive and a negative supply terminal, respectively, on a single portion of the battery jacket assembly. In this regard, the flexible battery jacket combines two or more batteries in parallel or series configuration and provides supply terminals on a single substrate surface for easily connecting with an electronic device.

Although a number of embodiments are illustrated and described herein, it should be recognized that a number of features and components can be otherwise combined in a myriad of other forms without departing from the spirit and scope of the invention. As such, the forgoing description is not intended to limit the scope of the invention as is set forth in the appended claims.

We claim:

1. A flexible battery jacket for electrically combining two or more batteries, comprising:
   a flexible substrate having a first portion, a second portion, and a third portion;
      the first portion having a first top surface and a first bottom surface opposite of the first top surface, and comprising:
         a first contact disposed on the first top surface, the first contact being adapted to couple with a first battery at a positive terminal thereof; and
         a second contact disposed on the first bottom surface, the second contact being adapted to couple with a second battery at a positive terminal thereof;
      the third portion having a first top surface and a first bottom surface opposite of the first top surface and comprising:
         a third contact disposed on the third bottom surface, the third contact being adapted to couple with the second battery at a negative terminal thereof;
      the second portion having a second top surface and a second bottom surface opposite of the second top surface, and comprising:
         a fourth contact disposed on the second bottom surface, the fourth contact being adapted to couple with the first battery at a negative terminal thereof;
         a positive supply terminal disposed on the second top surface;
         a first conductive trace adapted to couple the first and second contacts of the first portion with the positive supply terminal;
         a negative supply terminal disposed on the second top surface;
         a second conductive trace adapted to couple the third and fourth contacts with the negative supply terminal;
   wherein the flexible battery jacket is adapted to fold about the two or more batteries and provide said positive and negative supply terminals on a common surface for electrically connecting the two batteries and the flexible battery jacket to an electronic device.

2. The flexible battery jacket of claim 1, wherein the flexible battery jacket is adapted to couple the two or more batteries in a parallel configuration.

3. The flexible battery jacket of claim 1, wherein the flexible battery jacket is adapted to couple the two or more batteries in a series configuration.

4. The flexible battery jacket of claim 1, further comprising a fourth portion and additional contacts thereon for coupling three batteries.

5. The flexible battery jacket of claim 1, comprising a removable liner being adhered to the flexible substrate by a conductive adhesive.

* * * * *